United States Patent [19]

Sidman et al.

[11] Patent Number: 5,426,545
[45] Date of Patent: Jun. 20, 1995

[54] ACTIVE DISTURBANCE COMPENSATION SYSTEM FOR DISK DRIVES

[76] Inventors: Michael D. Sidman, 6120 Wilson Rd., Colorado Springs, Colo. 80919; David B. Davies, 317 S. Ankeny Blvd., Ankeny, Iowa 50021

[21] Appl. No.: 191,758

[22] Filed: Jan. 31, 1994

Related U.S. Application Data

[63] Continuation of Ser. No. 697,759, May 9, 1991, abandoned.

[51] Int. Cl.⁶ .............................................. G11B 5/55
[52] U.S. Cl. ............................ 360/78.09; 360/78.04; 360/75
[58] Field of Search ................ 360/75, 78.09, 78.04; 369/247; 318/560; 310/326

[56] References Cited

U.S. PATENT DOCUMENTS

| | | | |
|---|---|---|---|
| 3,836,835 | 9/1974 | Sawyer | 318/685 |
| 4,040,103 | 8/1977 | White | 360/75 |
| 4,297,734 | 10/1981 | Laishley et al. | 360/78.09 |
| 4,499,511 | 2/1985 | Sugaya | 360/78.14 |
| 4,692,915 | 9/1987 | Moriya et al. | 369/53 |
| 4,862,298 | 8/1989 | Genheimer et al. | 360/75 X |
| 4,914,644 | 4/1990 | Chen et al. | 360/78.09 |
| 4,947,093 | 8/1990 | Dunstan et al. | 318/560 |
| 5,036,506 | 7/1991 | Bierhoff | 360/78.09 |

FOREIGN PATENT DOCUMENTS

| | | | |
|---|---|---|---|
| 0264535A2 | 4/1988 | European Pat. Off. | 360/77 |
| 0306715A1 | 3/1989 | European Pat. Off. | 360/77 |
| 2011654 | 7/1979 | United Kingdom | 360/78.09 |

OTHER PUBLICATIONS

Sidman, "Adaptive Control of a Flexible Structure," A Dissertation Submitted to the Department of Electrical Engineering and the Committee on Graduate Studies of Stanford University, Jun. 1986.

*Primary Examiner*—A. Psitos
*Assistant Examiner*—Duncan Wilkinson
*Attorney, Agent, or Firm*—J. Bradford Leaheey; David B. Harrison

[57] ABSTRACT

The present invention senses angular acceleration of a Head Disk Assembly ("HDA") in a disk drive servo system and provides an acceleration feedback signal. A filter network filters the acceleration feedback signal and supplies a filtered signal for nullifying tracking error caused by shock, vibration and windup disturbances to the system.

3 Claims, 4 Drawing Sheets

ACTIVE DISTURBANCE COMPENSATION SYSTEM FOR DISK DRIVES

This application is a continuation of application Ser. No. 07/697,759, filed May 9,1991 and now abandoned.

FIELD OF THE INVENTION

The present invention generally relates to disk drive servo systems. In particular, this invention relates to methods and apparatus for providing active disturbance rejection of shock and vibration disturbances using measured angular acceleration of a Head Disk Assembly ("HDA") to provide an acceleration feedback signal to a disk drive head positioning servo system.

BACKGROUND OF THE INVENTION

In order to reliably read data from or write data onto a disk media surface of a disk drive, a read/write transducer or head must be positioned precisely over a track of the media surface from which data is read or on which data is written. Failure to accurately position the read/write head over the desired track during a read operation results in unreliable data retrieval. If the read/write head is improperly positioned during a write operation to the disk, not only may the written data be lost, but data on adjacent tracks may be written over and destroyed. The accurate placement of the read/write head is therefore crucial to the utility of disk systems.

One method used for head position control is a disk drive servo system. The disk drive servo system typically utilizes a head positioning actuator assembly for precisely positioning the head over the desired data track. The head actuator assembly includes an actuator motor which operates to position the head under the control of a head actuator servo loop. The head actuator control servo loop both initially positions the read/write heads over the desired data track and maintains the heads in that position.

The head actuator assembly and disks are typically housed in a Head Disk Assembly ("HDA"). The HDA is typically mounted to a drive chassis with the use of a plurality of shock mounts typically fabricated of rubber or other suitable compliant material. The stiffness of the shock mounts and other physical characteristics such as the inertia of the HDA determine the absorption or attenuation of shock forces applied to the HDA and to the drive chassis. This absorption or attenuation is practically limited due to geometrical constraints on HDA and shock mount size.

The application of physical vibration or shock to the drive chassis or internally generated vibration or shock to the HDA itself tends to cause positioning errors in the servo system. These disturbances may be introduced by, for example, spindle imbalance forces, external shock and vibration, as well as a self-induced shock mount/HDA resonance excitation known to those skilled in the art as windup. For example, reaction forces applied to the HDA by the actuator motor during seek activity may cause windup.

In known systems, a tradeoff exists between sensitivity to external shock and vibration on the one hand and to windup on the other. Higher compliance shock mounts may provide less sensitivity to chassis vibration but lower the HDA/shock mount resonant frequency and increase sensitivity to windup. The opposite is usually true also.

Known disk drive head positioning servo systems typically use a linear actuator assembly. This type of assembly utilizes a guided carriage arm assembly having a plurality of heads supported at one end and a voice coil at the other end with supporting bearings positioned between the voice coil and the heads. Other disk drive head positioning servo systems use an unbalanced rotary actuator. In these systems, the unbalanced rotary actuator may be a center-of-percussion type. In both such configurations, linear acceleration component sensing provides compensation for shock and vibration disturbances.

In the case of servo systems with a balanced rotary actuator, however, translational or linear HDA acceleration measurement accomplished with a single linear accelerometer cannot sense angular acceleration of the HDA without being sensitive to other HDA vibration components. Such components include both pure translational and other angular vibration components. Accordingly, known compensation or disturbance rejection systems, while performing satisfactorily for applications using linear or unbalanced rotary actuators, fail to address the problems of spindle imbalance forces, external shock or vibration and windup in systems having a balanced rotary actuator. This failure is due to the fact that only angular acceleration of the HDA in the direction of actuator rotation substantially causes positioning errors in systems that utilize a balanced rotary actuator. Other HDA acceleration components do not substantially induce such errors. Sensing these other components to provide compensation to the head positioning servo system typically induces positioning errors and, in fact, increases the sensitivity of the servo system to shock, vibration and windup.

SUMMARY OF THE INVENTION

The present invention overcomes the deficiencies in prior art systems with a Head Disk Assembly ("HDA") having a balanced rotary actuator head positioning assembly. A servo disturbance compensation or rejection system includes an angular acceleration sensor for direct, broadband measurement of HDA angular acceleration in the direction of actuator rotation. The angular acceleration sensor provides an acceleration feedback signal which augments existing feedback control signals for determining actuator motor current. In this way, the servo disturbance compensation system modifies the actuator assembly response to HDA shock and vibration during seek or track positioning operations for minimizing tracking errors.

A standard disk drive head positioning servo system provides feedback control signals related to the relative angular velocity or position error of the actuator compared to that of the HDA. The head positioning servo system provides an error signal indicative of relative angular position or relative angular velocity.

The present invention augments the position error signal with an angular acceleration feedback signal generated by an angular accelerometer mounted to the HDA. The angular accelerometer senses angular acceleration of the HDA caused by spindle imbalance forces, external shock and vibration, and self-induced HDA/shock mount resonance excitation typically caused by seek activity. The angular accelerometer has its sensitive axis oriented in the direction that induces positioning errors-that is, in the direction of balanced rotary actuator rotation relative to the HDA. The angular accelerometer provides an output acceleration signal to an amplifier having a preselected gain for the servo disturbance rejection system. The amplifier provides an acceleration feedback signal with an amplitude which is optimal to minimize tracking errors in the head positioning servo system due to these disturbances.

The servo disturbance compensation system includes a gain-stabilization filter network that receives the acceleration feedback signal and provides a filtered, band-limited acceleration feedback signal indicative of angular acceleration of the HDA. In this way, the servo system nullifies tracking error caused by such disturbances. The gain-stabilization network passes the filtered acceleration feedback signal to a summer which also receives the feedback control signals from the existing servo system. The summer provides a difference signal to a power amplifier which thereafter passes a motor current control signal to the actuator assembly.

DETAILED DESCRIPTION OF THE INVENTION

The present invention utilizes an active disturbance rejection system that senses angular acceleration of a Head Disk Assembly ("HDA") for minimizing positioning errors arising from external and internal shock and vibration of the HDA. The present invention is especially well suited for HDAs of the type using a balanced rotary actuator for positioning a read/write transducer over a desired data track. The system according to the present invention eliminates the problem of windup after seek and greatly attenuates positioning error due to steady-state vibration and random shock. Experimental results of the present invention demonstrate an ability to reduce average seek time for both read-after-seek and write-after-seek operations.

Figure 1:
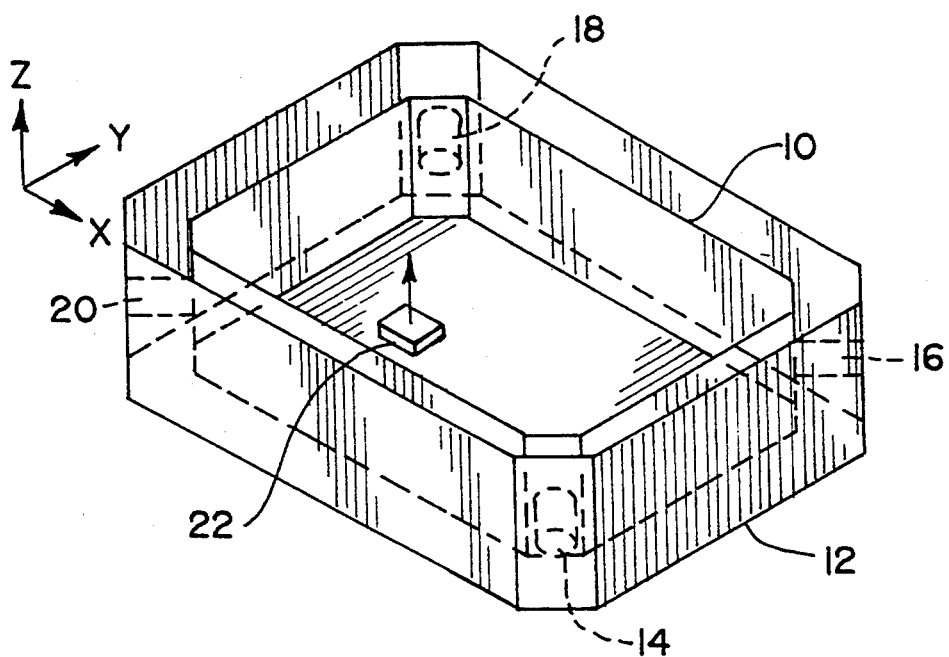
FIG. 1 is a perspective view of a Head Disk Assembly ("HDA") with an angular acceleration sensor according to the present invention.

FIG. 1 shows a perspective view of an HDA assembly 10 which is suitable for use with the present invention. The HDA assembly 10 is suspended from a supporting frame 12 with a plurality of shock mount elements 14–20. The shock mount elements are preferably fabricated of a rubber or other suitable material as will be understood by those skilled in the art. FIG. 1 also shows an angular acceleration sensor 22 which is mounted to the HDA 10. The angular acceleration sensor 22 has a sensitive axis in the z-direction which corresponds to the axis of rotation of a head positioning actuator (see FIG. 2). The location of the sensor 22 on the HDA assembly 10 is somewhat arbitrary since the HDA 10 acts as a rigid body at low frequencies. The sensitive axis of orientation of the angular acceleration sensor 22, however, is aligned orthogonally with respect to the direction of rotation of the balanced rotary actuator within the HDA 10 (see FIG. 2).

Figure 2:
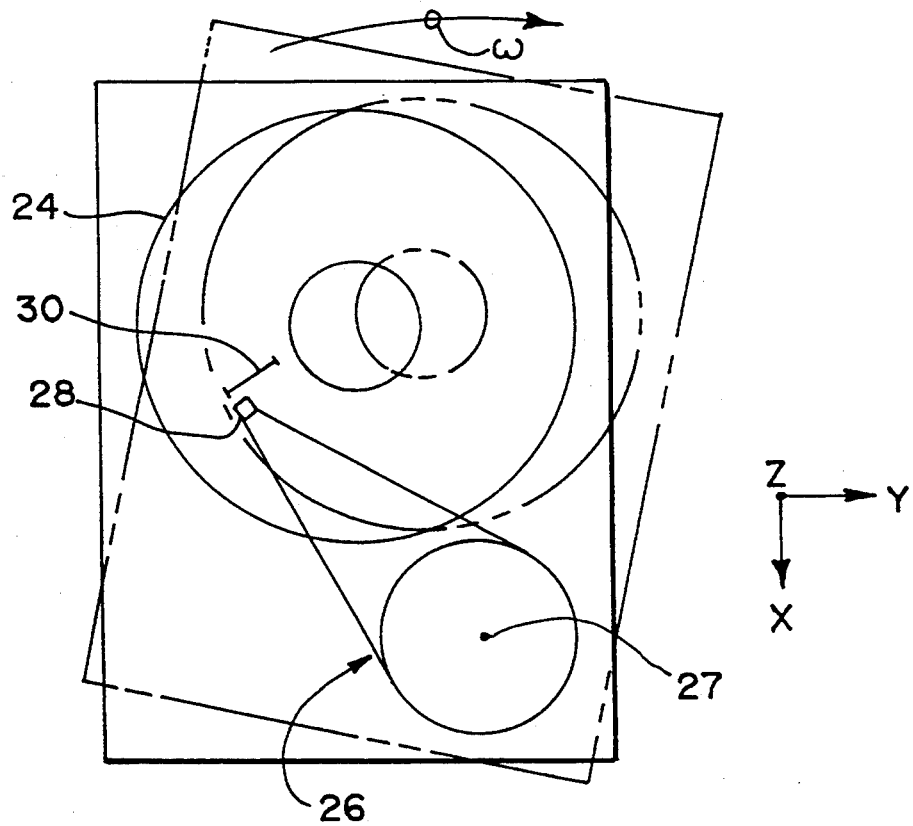
FIG. 2 is a simplified plan view and phantom view of the HDA of FIG. 1 showing the effect of rotation of the HDA on positioning error in a disk drive with a balanced rotary actuator assembly.

FIG. 2 illustrates a simplified plan view of the HDA 10. The HDA 10 includes a data storage media 24 which may be a single disk or a disk stack having a plurality of data tracks and mounted on a spindle (not shown). A balanced rotary actuator assembly 26 of a type well known to those skilled in the art pivots about an axis 27 upon the receipt of output torque provided by an actuator motor (not shown). The balanced rotary actuator assembly 26 positions a read/write transducer or head 28 at a preselected position relative to a desired data track on the disk 24 for performing a read or write operation. The actuator motor and assembly 26 operate upon receipt of an output control signal from the servo system to perform such operations.

FIG. 2 further illustrates an exaggerated rotation of the HDA 10 that produces an angular acceleration in the tangential direction omega (which corresponds to the vector direction z). Such angular acceleration of the HDA arises from a number of sources including reaction torque when the seeking actuator assembly 26 is in the seeking mode, spindle imbalance forces of the rotating disk or disk stack 24 and forces and torques transmitted through shock mount elements 14–20 resulting from external shock and vibration experienced by the drive chassis 10. As shown in FIG. 2 in the case of an uncontrolled, balanced actuator assembly, the orientation of a freely pivoting actuator assembly 26 and of the head 28 remains relatively fixed in inertial space. Accordingly, a resultant radial position error is developed represented by a line 30. On the other hand, purely translational motion of the HDA does not substantially produce radial position error when the rotary actuator assembly 26 is balanced.

Figure 3:
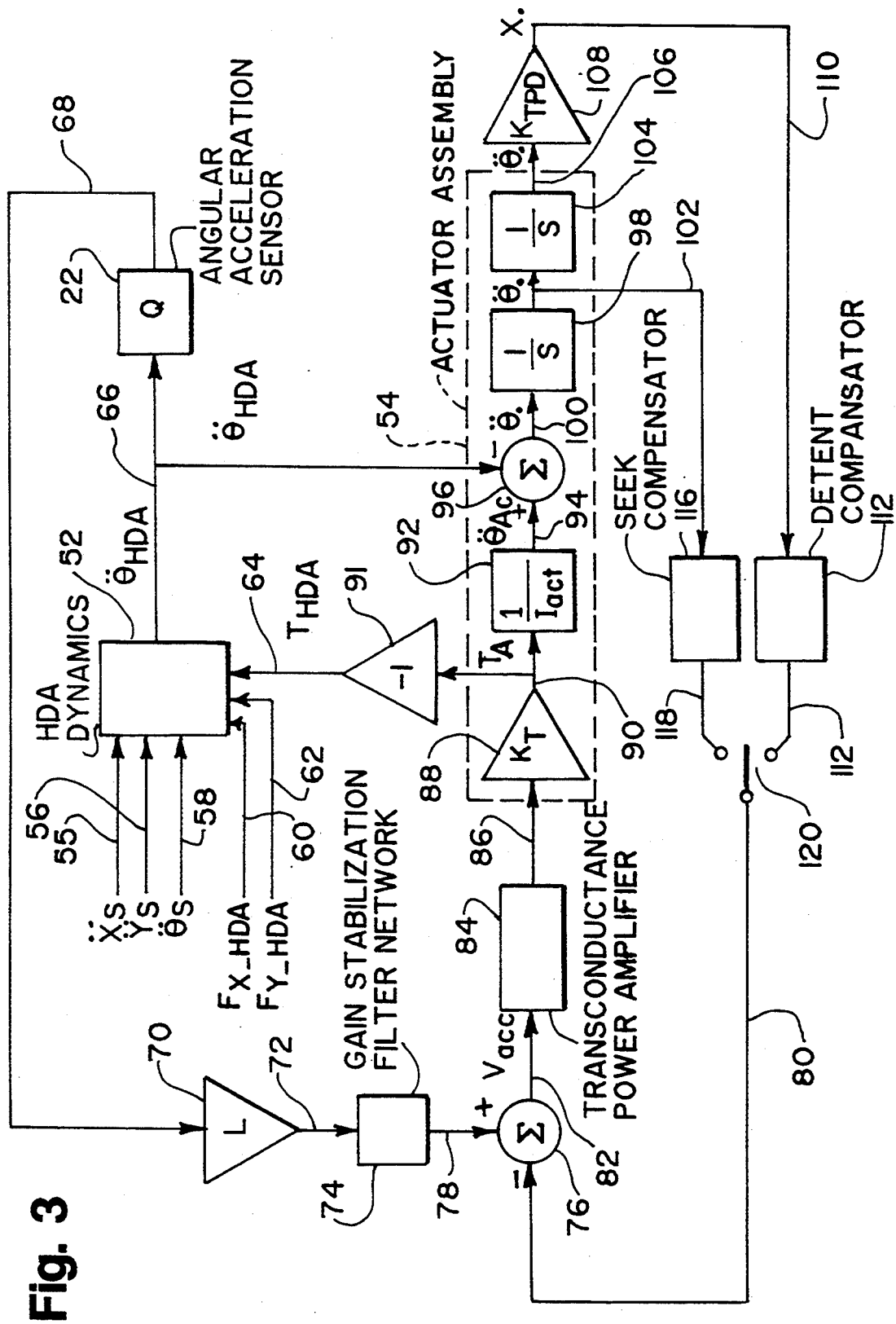
FIG. 3 is a block diagram representation of an active disturbance rejection system used in the HDA of FIGS. 1 and 2 according to the present invention.

FIG. 3 is a block diagram of an active disturbance rejection system 50 according to the present invention. For purposes of explanation, a model of the HDA assembly 10 of FIG. 1 showing the mechanical dynamics of the HDA assembly is represented by a block 52. In addition, a model of the actuator assembly 26 of FIG. 2 is represented by a block 54. The actual implementation of the elements shown by way of models of FIG. 3 is well known within the art.

The HDA 10 shown in FIG. 1 receives various translational and rotational force and acceleration components from the supporting frame 12. In FIG. 3, these force and acceleration components are shown as inputs to the HDA model 52. In addition, the HDA dynamics model 52 includes cross coupling and interaction of various mechanical modes. A linear acceleration component in the x-direction is shown as an input to the HDA model 52 on a line 55, a linear acceleration component in the y-direction is shown as an input on a line 56, and an angular acceleration vector component in the z-direction (see FIG. 2) is shown as an input on a line 58.

External shock and vibration typically introduce these acceleration components to the HDA model 52.

In addition, the HDA model 52 receives a force component in the x-direction shown as an input on a line 60 and a force component in the y-direction shown as an input on a line 62. The HDA model 52 also receives reaction torque in the z-direction shown as an input on a line 64 as a result of the actuator motor being directly mounted to the HDA in the disk drive system, as described in greater detail below. As a result of the various force and acceleration components, the HDA 10 shown in FIG. 1 undergoes an angular acceleration. The HDA dynamics model 52 illustrates this as an HDA output angular acceleration on a line 66.

FIG. 3 also illustrates an angular acceleration sensor 22. In the actual structure shown in FIG. 1, the angular acceleration sensor 22 is mounted to the HDA 10. The sensor 22 senses the broadband angular acceleration of the HDA 10 on the line 66 as illustrated from the HDA model 52 and supplies an acceleration output signal on a line 68. The acceleration output signal is thereafter passed to an amplifier 70 which provides an optimal gain for the acceleration signal for minimizing the effects of external vibration and wind-up disturbances, as discussed in greater detail below. The amplifier 70 supplies an output signal on a line 72 to a gain stabilization filter network 74.

The filter network 74 is used to limit the approximate frequency range for which the acceleration output signal is most important. In the preferred embodiment, the filter network 74 has a cut-off frequency of 200 to 400 Hz to attenuate the acceleration output signal received on the line 72 to within the desired frequency range. The disturbance rejection system is thus effective over a relatively wide range—from the low-frequency breakpoint of the angular accelerometer to the cut-off frequency of the filter network. This cut-off frequency band is usually above the frequency in which the effects of shock, vibration and windup to the HDA produce head positioning errors. The filter network 74 may also notch filter the acceleration signal as well. In this way, the filter network 74 desensitizes the angular acceleration feedback path from any high frequency resonances that otherwise tends to destabilize the system. Those skilled in the art will appreciate that the design of the amplifier 70 and the filter network 74 are well known and may be interchanged in the overall circuit without affecting the operation.

Upon receipt of the acceleration output signal, the filter network 74 passes a filtered output signal within the selected frequency range to a summer 76 via a line 78. The summer 76 also receives a compensation signal indicative of operation of the actuator assembly 54 via a line 80, which is described below. The summer 76 provides an output acceleration command signal on a line 82. In the preferred embodiment, the acceleration command signal is a voltage signal but other forms of signal, for example, a current signal, are within the scope of the invention.

A transconductance power amplifier 84 receives the command signal on the line 82 and provides an output current signal on a line 86. This output current signal on the line 86 is a current signal which is supplied to the rotary actuator motor, represented by a motor torque constant 88.

As with the HDA model 52, the head actuator assembly 26 of FIG. 2 is represented by the block 54. As noted above, the block 54 is a model of an actuator assembly for a disk drive system. The head actuator assembly model 54 includes an actuator motor represented by the motor torque constant 88. The actuator motor 88 receives the motor current signal on the line 86 and supplies a torque output on a line 90 which is the torque applied to the rotary actuator.

In the model, the motor 88 also supplies this torque output to an inverter 91. The inverter 91 represents the conversion of motor torque to HDA torque—an equal and opposite reaction torque which the motor applies to the HDA model 52. The reaction torque is provided in the z-direction to the HDA model 52 on the line 64.

The head actuator assembly model 54 also includes a block 92 which represents the reciprocal motor inertia of the actuator assembly. In this way, an actuator angular acceleration is determined. The block 92 provides the output actuator angular acceleration shown by a line 94.

Inasmuch as the actuator assembly 26 is mounted typically within the HDA assembly 10 as shown in FIG. 2, the HDA angular acceleration represented by the line 66 and the angular acceleration of the actuator assembly represented by the line 94 are illustratively shown in FIG. 3 as supplied to a summer 96. The representive summer 96 supplies a difference acceleration which is the relative acceleration to a first representive integrator 98 shown by a line 100. The integrator 98 in the head actuator assembly model 54 determines relative angular velocity shown by a line 102 indicative of relative angular velocity of the actuator as compared to that of the HDA.

A second representative integrator 104 receives the relative angular velocity on the line 102 and provides a position error on a line 106 indicative of relative angular position. This relative angular position or position error corresponds to the radial position error of the head 28 with respect to the selected data track (see FIG. 2). Since the spindle is coupled to the HDA, the radial position of the selected data track and the angular position of the HDA correspond.

A track position detector 108 senses the position error on the line 106 and provides a position error signal on a line 110. The position error signal on the line 110 is supplied to a detent compensator 112 which is known to those skilled in the art. The compensator 112 provides a compensation signal on a line 114. This compensation signal is utilized for detent (or on-track positioning) operations of the head positioning servo system.

Similarly, the velocity signal on the line 102 is representatively supplied to a seek compensator 116 of the type known to those skilled in the art. The seek compensator 116 provides a compensation signal on a line 118. The compensation signal on the line 118 is typically used for seek operations of the servo system.

FIG. 3 also shows the representation of a switch 120. The switch operates to couple the output signal of the seek compensator 116 with the summer 76 during a seek operation in a first mode. In a second mode, the switch operates to couple the output signal of the detent compensator 112 with the summer 76 during on-track read and write operations.

In operation, the HDA assembly 10 receives mechanical inputs corresponding to various disturbances to the system. The accelerometer 22 senses the angular acceleration of the HDA assembly 10 and provides the angular acceleration output signal on the line 68.

One feature of this invention is the determination of the optimal feedback gain (L) for the acceleration signal. This gain is determined by a preselected scalar quantity equal to the actuator motor inertia (Iact) divided by the quantity of motor torque constant (Kt) times accelerometer gain (Q) times power amplifier gain (Kpa). This fixed gain quantity provides the optimal gain for the acceleration feedback signal. Accordingly, the multiplier 70 multiplies the acceleration feedback signal received on the line 68 by the optimal gain L and provides the acceleration feedback signal on the line 72.

Figure 4:
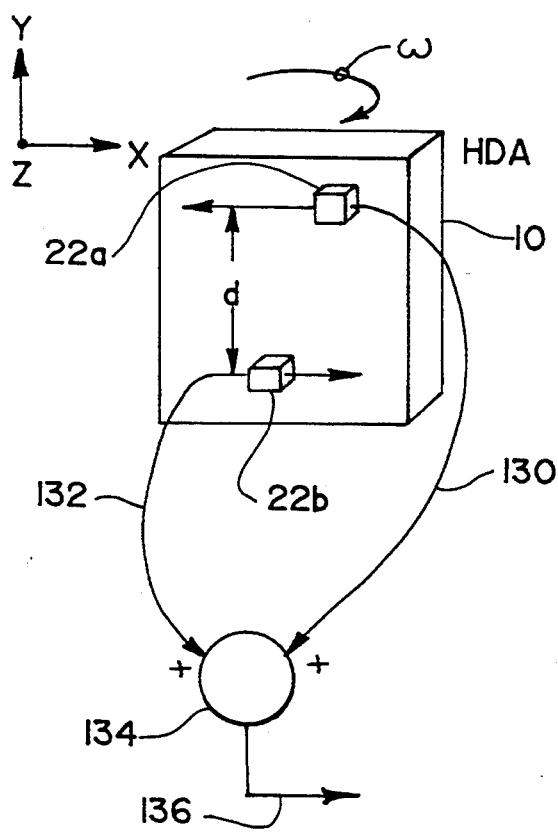
FIG. 4 is a block diagram representation of a pair of linear accelerometers arranged in a push-pull configuration for measuring angular acceleration in the active disturbance rejection system of FIG. 3.

FIG. 4 shows one implementation of the angular acceleration sensor 22 shown in FIG. 1 and used in the control system of FIG. 3. The acceleration sensor shown in FIG. 4 uses first and second linear accelerometers 22a and 22b which are mounted in a push-pull configuration on the HDA assembly 10. The first linear accelerometer 22a is shown with its sensitive axis in the negative x-direction and the second linear accelerometer 22b with its sensitive axis in the positive x-direction. Of course, the first and second linear accelerometers 22a and 22b may also have their sensitive axes oriented in any opposed direction orthogonal to the z-direction in the plane of rotation of the actuator assembly. The linear accelerometers 22a and 22b are separated by a distance d.

In the arrangement shown in FIG. 4, the first and second linear accelerometers 22a and 22b sense angular acceleration in the tangential direction of omega and generate a first and second linear acceleration signals on lines 130 and 132. These acceleration signals are supplied to a summer 134 which provides a sensed acceleration output signal on a line 136. The summer 134 cancels any translational acceleration components measured by the first and second linear accelerometers 22a and 22b. The gain Q of the angular acceleration sensor 22 shown in FIG. 3 is proportional to the distance d between the first and second linear accelerometers, and determines the magnitude of the sensed acceleration output signal on the line 136 to an angular acceleration of the sensor in the z-direction. Those skilled in the art to which this invention pertains will appreciate that the angular acceleration sensor may be implemented in any number of arrangements and does not necessarily need to be implemented as shown in FIG. 4.

Figure 5:
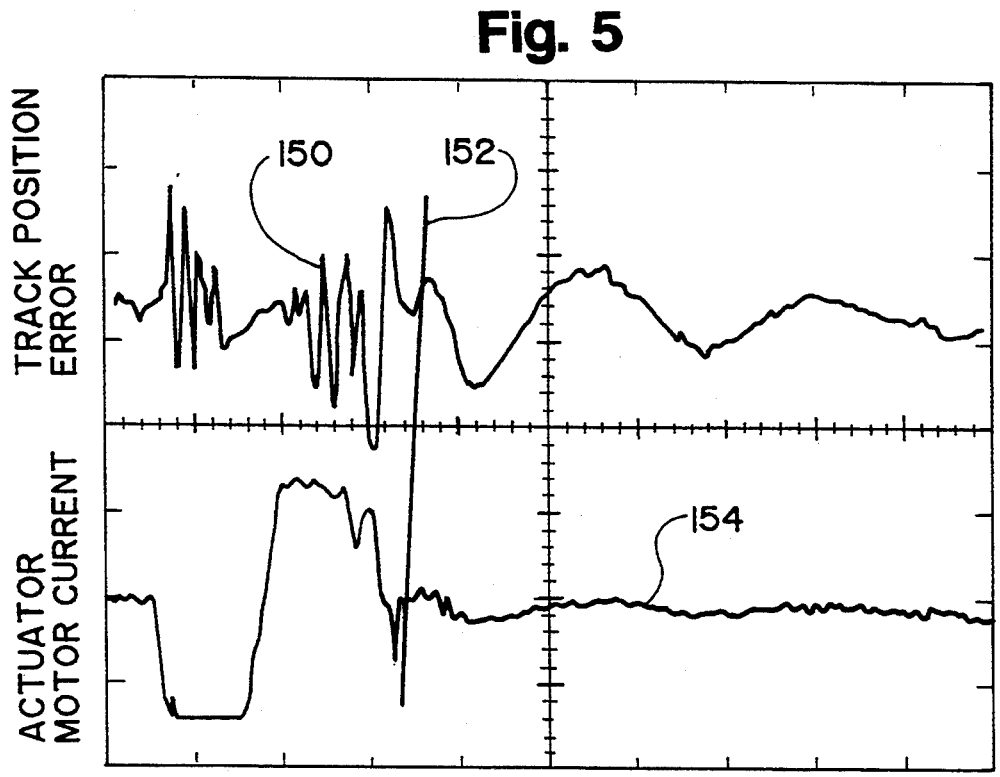
FIG. 5 is a graphical representation of track position error and actuator motor current during and after a seek operation without the use of acceleration feedback according to the present invention shown as a function of time.
Figure 6:
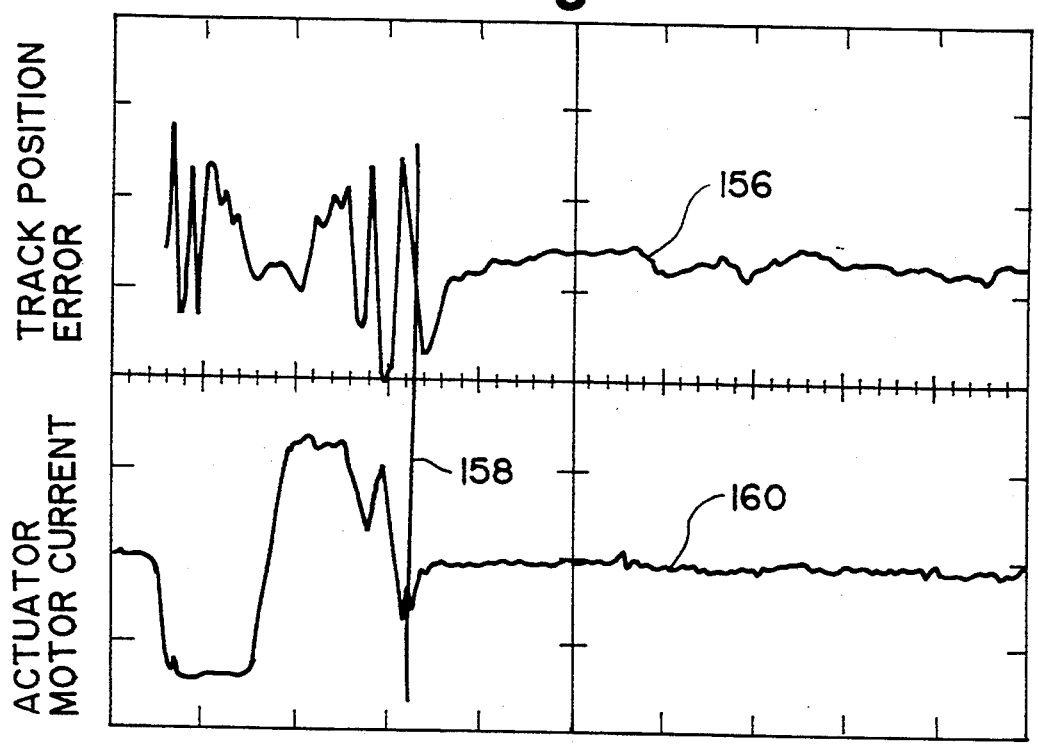
FIG. 6 is a graphical representation of track position error and actuator motor current during and after a seek operation with the use of acceleration feedback according to the present invention shown as a function of time.
Figure 7:
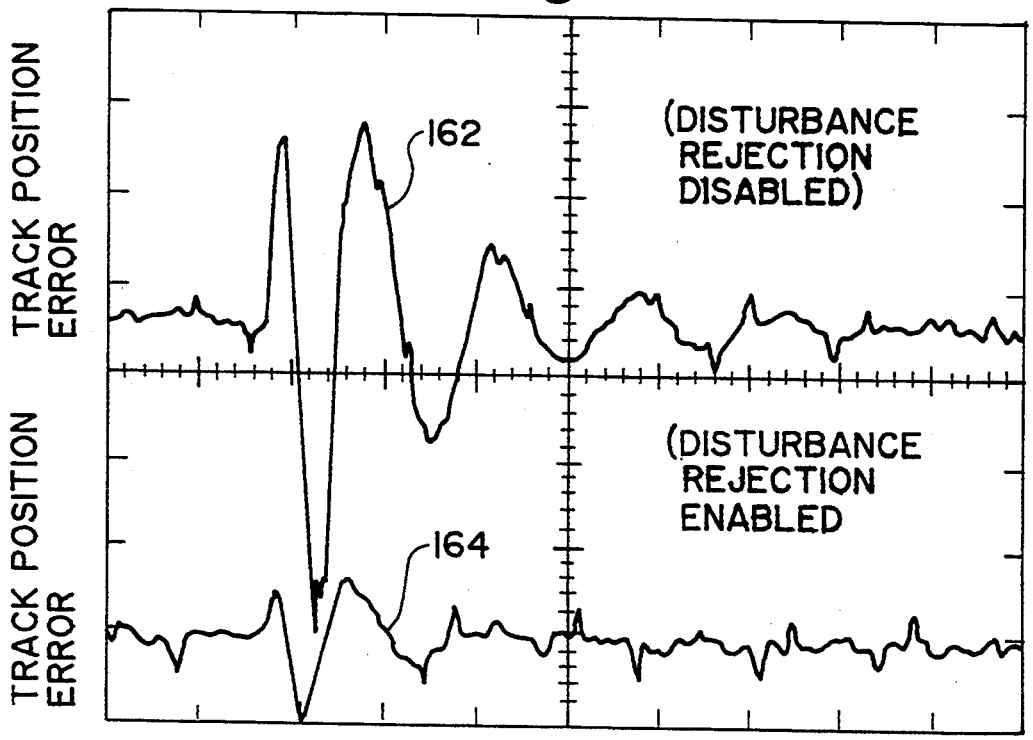
FIG. 7 is a graphical representation of a comparison of track position error upon receipt of a calibrated impulse to the HDA in both an uncompensated system and a compensated system as a function of time.

Experimental results for the system according to the present invention are shown in FIGS. 5 through 7. In FIG. 5, a line 150 represents track position error as a function of time, and illustrates its large dynamic range without the use of angular acceleration feedback to the system. The portion of the line 150 to the left of a line 152 illustrates the system in the seek mode and the portion of the line 150 to the right of the line 152 illustrates the system in the detent mode. As seen in FIG. 5, the absence of disturbance rejection feedback results in undesired oscillation in the detent mode from ringing (windup) at the frequency of the HDA/shock mount resonance. FIG. 5 also shows a line 154 which represents actuator motor current for both the seek mode and the detent mode. The variation of line 154 in the detent mode indicates control effort being used by the servo to only partially control windup errors.

FIG. 6 illustrates track position error and actuator motor current for the system with disturbance rejection enabled. In this case, a line 156 represents track position error with the addition of acceleration feedback according to the present invention for both the seek mode which is the portion of line 156 to the left of line 158 and the detent mode which is the portion of line 156 to the right of line 158. As with FIG. 5, a line 160 represents actuator motor current for both the seek mode and the detent mode. FIG. 6 shows the elimination of disturbances caused by windup with use of the disturbance rejection system.

FIG. 7 illustrates a comparison of track position error of an uncompensated system represented by a line 162 and a compensated system represented by a line 164 upon receipt of a calibrated impulse or shock disturbance to the system. The disturbance rejection system demonstrates significantly reduced positioning error from shock disturbance.

Thus there has been described herein a system which provides active disturbance rejection to a disk drive servo system by measuring angular acceleration and providing an acceleration feedback signal to the system. Accordingly, while the present invention disclosed herein has been described with reference to the presently contemplated best mode for practicing the invention, it is intended that this invention be limited only by the scope of the appended claims.

What is claimed is:

1. A method for providing active disturbance compensation in a head disk assembly having a head for reading or writing data from a disk, a balanced rotary actuator assembly including an actuator motor having an inertia and a selected motor torque constant and providing an output motor torque to said assembly for positioning said head relative to a preselected data track on said disk, a disk drive servo system including power amplifier means having a selected gain for providing a current command signal to said actuator motor, said servo system further including means for generating a relative angular velocity signal corresponding to a relative angular velocity of said balanced rotary actuator assembly with respect to said head disk assembly during a seek phase and means for generating a position error signal corresponding to a difference between an actual position of said head and said preselected data track during an on-track positioning phase, an angular acceleration sensor having a selected gain, and a multiplier means coupled to said angular acceleration sensor and said head disk assembly, said method comprising:

sensing the angular acceleration of said head disk assembly with said angular acceleration sensor and providing an angular acceleration feedback signal;

multiplying with said multiplier means said acceleration feedback signal by an optimal gain approximately equal to said inertia of said actuator motor divided by said motor torque constant times said gain of said acceleration sensor times said gain of said power amplifier and providing an enhanced acceleration feedback signal;

filtering said enhanced acceleration feedback signal within a preselected frequency range and providing a filtered acceleration feedback signal;

generating a control signal by summing said filtered acceleration feedback signal with either (i) said relative angular velocity signal when a switch is in a first setting during said seek phase or (ii) said position error signal when said switch is in a second setting during said on-track positioning phase; and supplying said control signal to said power amplifier for adjusting the current control signal to adjust the position of said head.

2. An active disturbance compensation system incorporated in a head disk assembly having a head for reading or writing data from a disk, a balanced rotary actuator assembly including an actuator motor having an inertia and a selected motor torque constant and providing an output motor torque to said assembly for positioning said head relative to a preselected data track on said disk, the system comprising:

power amplifier means for providing a current command signal to said actuator motor for positioning said head, said power amplifier means having a selected gain;

means for generating a relative angular velocity signal corresponding to a relative angular velocity of said balanced rotary actuator assembly with respect to said head disk assembly during a seek phase;

means for generating a position error signal corresponding to a difference between an actual position of said head and said preselected data track during an on-track positioning phase;

an angular acceleration sensor coupled to said head disk assembly and having a selected gain for sensing the angular acceleration of said head disk assembly and providing an angular acceleration feedback signal;

means for multiplying said acceleration feedback signal by an optimal gain approximately equal to said inertia of said actuator motor divided by said motor torque constant times said gain of said acceleration sensor times said gain of said power amplifier and providing an enhanced acceleration feedback signal;

filter network means for receiving said enhanced acceleration feedback signal and for providing a filtered acceleration feedback signal within a preselected frequency range; and means for generating a control signal by summing said filtered acceleration feedback signal with either (i) said relative angular velocity signal when a switch is in a first setting during said seek phase or (ii) said position error signal when said switch is in a second setting during said on-track positioning phase and providing said control signal to said power amplifier means for adjusting said current control signal to adjust said current command signal.

3. The active disturbance compensation system of claim 2 wherein said angular acceleration sensor comprises:

first linear accelerometer means mounted to said head disk assembly for measuring linear acceleration in a first direction and providing a first acceleration output signal;

second linear accelerometer means mounted to said head disk assembly for measuring linear acceleration in a second direction opposed to said first direction and providing a second acceleration output signal; and second summing means for receiving said first and second acceleration output signals and providing said angular acceleration feedback signal.

* * * * *